Figure 1:
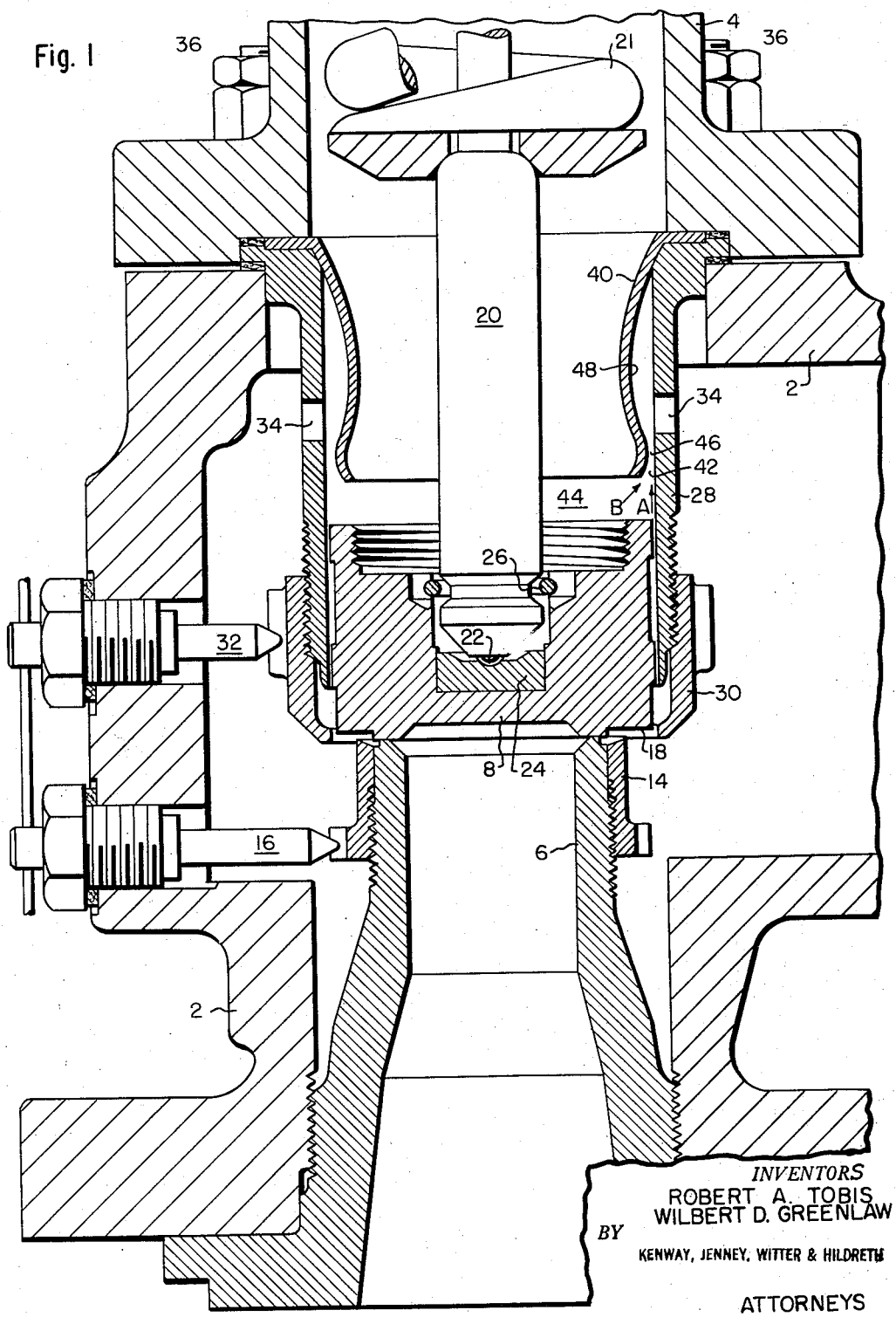

April 7, 1959 R. A. TOBIS ET AL 2,880,751
RELIEF VALVES
Filed Dec. 13, 1956 2 Sheets-Sheet 1

INVENTORS
ROBERT A. TOBIS
WILBERT D. GREENLAW
BY
KENWAY, JENNEY, WITTER & HILDRETH
ATTORNEYS

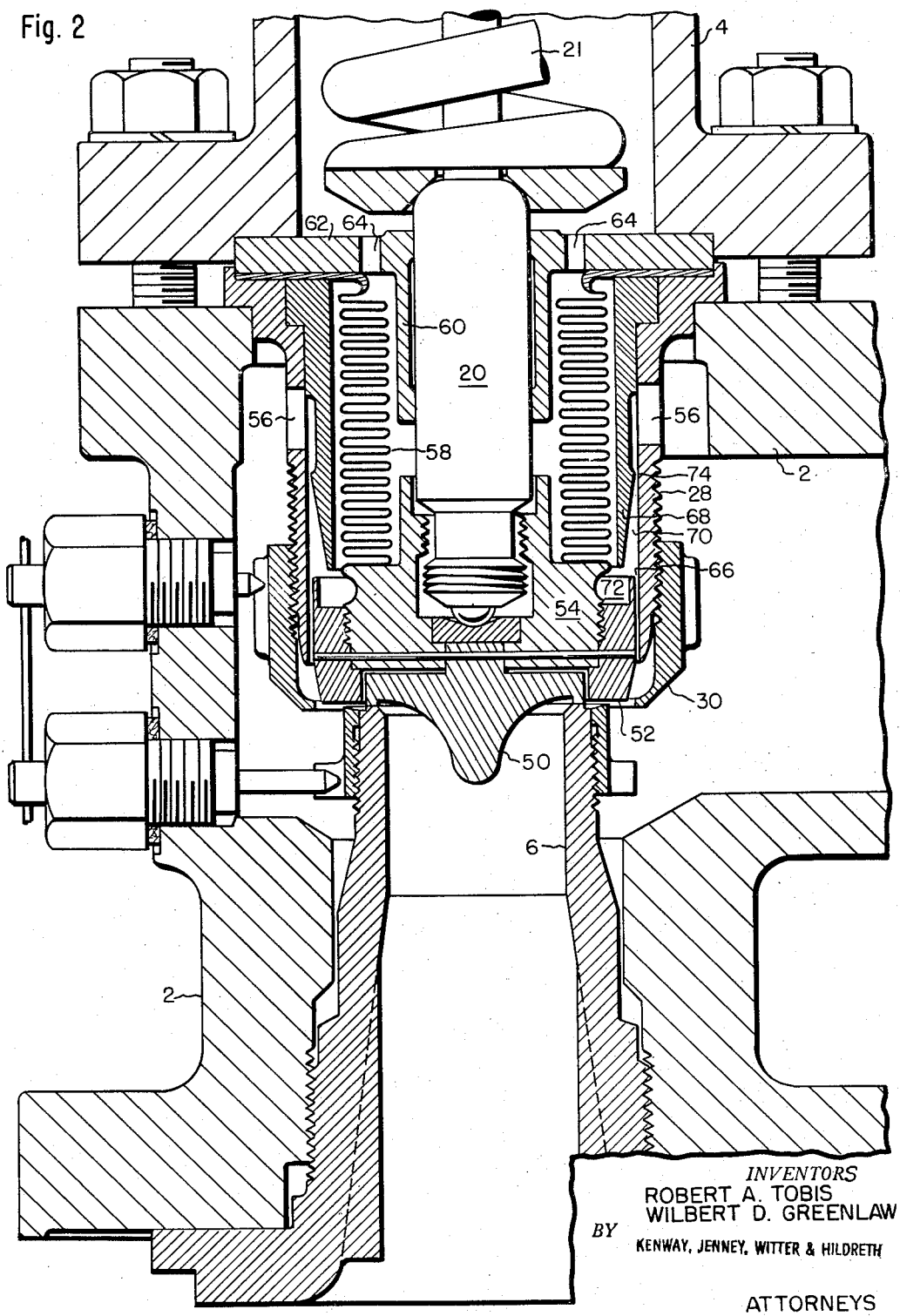

United States Patent Office 2,880,751
Patented Apr. 7, 1959

2,880,751

RELIEF VALVES

Robert A. Tobis, Walpole, and Wilbert D. Greenlaw, Westwood, Mass., assignors to Crosby Valve & Gage Company, a corporation of Massachusetts Application December 13, 1956, Serial No. 628,182

10 Claims. (Cl. 137—478)

The present invention relates to relief valves and more particularly to relief valves in which the effect of back pressure is reduced.

In the use of a relief valve on a fluid that is noxious or inflammable or has economic value it is necessary to connect the valve outlet with a discharge system. In some cases, several valves may be connected to the same closed system. Often it is necessary to maintain the fluids in the outlet system under a pressure, but even if the outlet pressure under static conditions is low, a back pressure effect exists on the relief valves under flow conditions, because of pressure drops in the discharge line; for example, the discharge from any one valve increases the back pressure on the other valves.

Back pressure affects the conventional relief valve in two ways, namely, by changing the opening pressure, and by diminishing the capacity of the valve. These effects are well known and may be briefly described by considering a standard relief valve with a spring bonnet which is non-vented to atmosphere but is vented to the valve discharge. The back pressure existing in the discharge line operates downwardly over the whole area of the disk and upwardly over only that part of the disk that overhangs the nozzle. Thus the so-called superimposed back pressure (i.e., the pressure existing in the discharge line just prior to the instant of opening of the valve) increases the opening pressure of the valve.

The second effect, namely, the effect on capacity, is due to the build-up back pressure, which is the increase of back pressure due to the discharge of the valve itself after opening.

Once the valve opens, the back pressure in the enclosed bonnet will be raised. Since the lifting forces beneath the disk area closely approximate the closing force of the spring, it takes very little excess back pressure to cause the valve to close. When the valve closes the back pressure drops and the initial conditions that caused the valve to open are restored. The result is either a rapid cycling or chatter of the valve, or an equilibrium condition of partial opening, which is unsatisfactory. In the use of conventional spring-restrained relief valves it has been found that back pressures in excess of 10% of the inlet pressure will cause this cycling or chattering effect. Therefore this condition imposes a serious limitation on design of outlet systems.

In an effort to avoid the effect of back pressure various expedients have been proposed, one of which is a bellows to enclose the area of the piston opposite the valve seat. This theoretically removes the effect of superimposed back pressure on the opening pressure; in other words, the valve will start to open at its set pressure. It has been found that the bellows type of relief valve permits a back pressure of up to 30% of the inlet pressure without seriously affecting the performance or lift of the valve. However, at a back pressure above 30% of the inlet pressure the valve capacity and lift are seriously reduced, because of the effects of build-up back pressure.

Therefore, while the bellows-type of relief valve is an improvement over the ordinary spring valve, there is still a serious limitations on the design characteristics of the outlet system.

It is the prinicpal object of the present invention to provide a relief valve in which the detrimental effect of back pressure is eliminated or substantially reduced. With this object in view, one of the principal features of the present invention is the utilization of the flow of the fluid discharged by the relief valve to diminish the pressure above the overhanging disk or piston of the valve.

Other objects will become apparent in the below description of the relief valves of the present invention.

In the drawings illustrating the present invention:

Fig. 1 is a sectional elevation of a relief valve embodying the features of the present invention, and Fig. 2 is a section elevation of a bellows-type relief valve embodying the present invention.

The valve shown in Fig. 1 is enclosed within a body 2 which defines a chamber or a portion of the outlet system. Attached to the upper portion of the body 2 is an enclosed bonnet 4, only the lowest portion of which is shown. A nozzle 6 is threaded into the body 2. The upper end of the nozzle 6 is partially tapered to form a part of a converging nozzle which acts with the valve disk or piston 8 to form the other half of the converging nozzle. The upper end of the nozzle 6 is engaged by the valve disk 8 to form the seat of the valve. An adjustable nozzle ring 14 is threaded onto the nozzle 6 and is retained by a set screw 16. When the valve is open the pressure acts on the overhanging area 18 of the disk 8 to add to the lifting force on the valve.

The disk 8 is restrained against the inlet pressure by a spring-loaded spindle 20. A spring 21 provides the spring force for this purpose. The spindle 20 has a spindle ball 22 at its lower end which bears against a disk insert 24. A snap ring 26 inserted around the grooved portion of the spindle 20 fits into a corresponding groove in the disk 8 and holds the spindle within the disk 8.

The movable disk 8 slides freely in a cylindrical casing 28. There is an appreciable clearance space between the disk 8 and the casing 28. Threaded to the lower portion of the casing 28 is an adjustable deflector ring 30, which is held in position by a set screw 32. Above the upper surface of the disk 8 is a series of ports 34 in the wall of the casing 28 which open the interior of the valve to the outlet chamber and hence to the outlet system. Supported between the casing 28 and the bolts 36 holding the bonnet 4 to the body 2 is an eductor 40 in the form of an internal sleeve. The space between the eductor 40 and the wall of the casing 28 is a fluid passage, the purpose of which is discussed below:

The shape of the eductor 40 is important. As shown in Fig. 1 it is contracted inwardly at the bottom whereby a narrowing passage 42 leads upwardly from the space 44 directly above the disk 8. The passage 42 diminishes to minimum size at a region 46 somewhat below the ports 34. Above the region 46 the sleeve again contracts as indicated at 48 in order to provide an enlarged passage between the sleeve and the wall of the casing 28.

The purpose of the eductor 40 is to provide an eduction or injector action whereby particles of fluid in the space 44 above the disk are swept out of that region through the passage 42 and ports 34 into the outlet passage of the valve.

When the valve is closed the parts are as shown in Fig. 1. Line pressure in the nozzle 6 acts over the entire seating area, while such back pressure as exists in the outlet passage acts upwardly on the overhanging area 18 of the disk and downwardly over the entire area of the disk that is exposed to the space 44. This back pressure which exists at the time that the valve is closed may be termed the superimposed back pressure. Since the back pressure acts downwardly over an area greater than that over which it acts upwardly, the forces due to back pressure are not balanced. Hence the pressure at which the relief valve opens will depend on the superimposed back pressure; this is a characteristic of all valves of this type and is a limitation on the amount of superimposed back pressure that can exist in the system.

The most serious back pressure effects, however, are those due to the "build-up," namely the increase of back pressure that would exist in the chamber 44 except for the eductor tube 40 of the present invention. Without the eductor, the back pressure in the outlet passage increases when the valve opens, and the amount of increase of the back pressure depends upon the resistance to flow in the outlet conduit. In any event, the build-up of back pressure is communicated to the chamber above the disk and hence tends to cause the disk to close, giving rise either to the chatter condition or the partial open condition previously described.

According to the present invention, as the jet of fluid passes the portion of the disk 18 a part of the jet is deflected by the deflector ring 30 and passes at a high velocity through the clearance area between the disk 8 and the casing 28 and thence upwardly through the eductor passage 42 as indicated by the arrow A. As the fluid passes through the converging passage 42, its pressure diminishes, and hence particles of fluid existing in the region 44 are educted or aspirated into the region of lower pressure as indicated by the arrow B. Above the region of minimum cross-section of the eductor passage the fluid expands into an increased area so that its pressure increases to a value which will cause the fluid to be expelled through the ports 34 into the outlet passage of the valve.

In a typical example, the valve may be set to pop at a pressure of, say, 200 p.s.i., which means that in the absence of back pressure it would open at 200 p.s.i. Assume that there is a superimposed back pressure of 20 p.s.i. In the configuration of Fig. 1, because of the unbalanced areas subjected to back pressure, the actual opening pressure may be nearly 220 p.s.i.

After the valve opens the back pressure increases because of the build-up. The amount of build-up depends on the flow conditions existing in the outlet passage. Assume that the build-up is such that the back pressure in the outlet passage in the immediate vicinity of the casing 28 is 40 p.s.i. In the absence of the eductor this back pressure would also exist in the space 44. Since the valve opened at about 220 p.s.i. when the opening force was only slightly greater than the sum of all the forces tending to keep the valve closed, the presence of the increased back pressure due to build-up would then tend to close the valve. However, the eductor sleeve diminishes the pressure in the space 44 to a value intermediate between 20 and 40 p.s.i. Although the effect of increased pressure in the region 44 due to build-up may not be entirely eliminated, it is sufficiently reduced so that cycling and chattering effects are eliminated. Although the back pressure due to build-up will be slightly greater than the superimposed back pressure and consequently the valve may not open as wide as it would in complete absence of back pressure, the opening will be substantially greater than without the eductor.

In the construction shown in Fig. 2, a bellows is employed and the valve is in some respects preferable to that of Fig. 1, in that the opening pressure is not affected by the superimposed back pressure, and the valve is insensitive to build-up back pressure over an even greater range than the valve of Fig. 1.

The body 2, the bonnet 4, and the nozzle 6 are similar to the corresponding parts of Fig. 1, as are also the spindle 20, the spring 21, and the spindle ball 22. The disk construction may be similar to the disk 8 of Fig. 1, but is here shown as a member 50 mounted for slight freedom of movement on the disk ring 52 and tail piece 54. The cylindrical wall or casing 28 and the deflector 30 are as in the construction of Fig. 1, the casing being provided with suitable exhaust ports 56.

A conventional bellows 58 is provided, being secured at the bottom to the tail piece 54 and suitably secured at its upper end in the casing. The bellows preferably has an effective area approximately equal to the area of the valve seat.

The spindle 20 slides in a bearing or sleeve 60 formed on a plate 62 which is suitably secured between flanges on the body and the bonnet. The plate 62 has openings 64 by which the interior of the bellows communicates with the bonnet and hence with atmosphere.

As shown in Fig. 2 there is a clearance space 66 between the disk ring 52 and the casing 28. There is also provided an eductor sleeve 68 which provides a converging passage 70 leading from the region 72 immediately above the disk ring toward a region 74 of minimum cross-section somewhat below the ports 56. Above the minimum area region 74 the passage expands in venturi fashion to an increased area wherein the pressure may increase sufficiently to eject the fluids through the ports 56.

When the valve is closed the interior of the bellows is subjected to atmosperic pressure, and since the effective area of the bellows is preferably the same as the seat area, the superimposed back pressure does not have an effect on the pressure required to open the valve. This is due to the fact that the superimposed back pressure is balanced since the downward forces of the back pressure existing in the region 72 balance the upward forces due to the back pressure acting on the disk ring 52. The bellows valve therefore has the advantage of opening under a pressure that is independent of the back pressure.

When the valve opens, however, there is a build-up of back pressure exactly as in the valve of Fig. 1. If it were not for the eductor 68, the build-up back pressure would tend to cause closing of the valve, with the possible result of chattering or partial opening, except that the bellows would permit satisfactory operation over a wider range of back pressure than in the non-bellows conventional valve.

According to the present invention, because of the eductor sleeve 68 the pressure existing in the space 72 is diminished below what the pressure would be if the eductor were omitted. The eduction action occurs by virtue of the deflection of a portion of the jet of fluid by the deflector 30 and its passage upwardly through the clearance space 66 and through the venturi-like converging and the diverging passages around the eductor 68. This causes fluid to be aspirated or educted from the space 72 in the same fashion as described for Fig. 1. The pressure in the space 72 is therefore less than the pressure in the outlet passage. Hence, when the valve starts to open it is subjected to opening forces which tend to maintain it open.

In either form of the invention satisfactory operation is attained under back pressures markedly higher than those which can be tolerated in conventional valves. With the bellows construction of Fig. 2, in particular, it has been found that the valve operates satisfactorily with full lift under a back pressure as high as 65% of the line pressure.

Having thus described the invention, we claim:

1. A relief valve having, in combination, a body having an inlet passage and an outlet passage, means in the inlet passage to form a valve seat, a movable valve member, spring means acting normally to hold the valve member on the seat, a cylindrical casing enclosing the valve member with clearance space between the valve member and casing, means for directing fluid upwardly through the clearance space, the casing forming an open space above the valve member, the casing having a port leading into the outlet passage, and eductor means operated by fluid passing upwardly through said clearance space to exhaust fluid from said open space and thereby reduce the back pressure on the valve member.

2. A relief valve having, in combination, a body having an inlet passage and an outlet passage, means in the inlet passage to form a valve seat, a movable valve member, spring means acting normally to hold the valve member on the seat, a cylindrical casing enclosing the valve member with clearance space between the valve member and casing, means for directing fluid upwardly through the clearance space, the casing forming an open space above the valve member, the casing having a port leading into the outlet passage, and an eductor sleeve in the casing above the valve member and forming a venturi-like passage with the inner wall of the casing to educt fluid from said open space when the valve opens.

3. A relief valve having, in combination, a body having an inlet passage and an outlet passage, means in the inlet passage to form a valve seat, a movable valve member, spring means acting normally to hold the valve member on the seat, a cylindrical casing enclosing the valve member with clearance space between the valve member and casing, means for directing fluid upwardly through the clearance space, the casing forming an open space above the valve member, the casing having a port leading into the outlet passage, and an eductor sleeve in the casing above the valve member and forming with the inner wall of the casing a converging passage communicating with said open space and a diverging passage communicating with said port.

4. A relief valve having, in combination, a body having an inlet passage and an outlet passage, means in the inlet passage to form a valve seat, a movable valve member, spring means acting normally to hold the valve member on the seat, a cylindrical casing enclosing the valve member with clearance space between the valve member and casing, means for directing fluid upwardly through the clearance space, the casing forming an open space above the valve member, the casing having a port leading into the outlet passage, a bellows member attached to the valve member, and eductor means between the bellows member and the casing and operated by fluid passing upwardly through said clearance space to exhaust fluid from said open space to reduce back pressure on the valve member.

5. A relief valve having, in combination, a body having an inlet passage and an outlet passage, means in the inlet passage to form a valve seat, a movable valve member, spring means acting normally to hold the valve member on the seat, a cylindrical casing enclosing the valve member with clearance space between the valve member and casing, means for directing fluid upwardly through the clearance space, the casing forming an open space above the valve member, the casing having a port leading into the outlet passage, a bellows member attached to the valve member, and eductor means between the bellows member and the casing, said eductor means comprising a sleeve forming a venturi-like passage with the inner wall of the casing.

6. A relief valve having, in combination, a housing defining a chamber and having an outlet and an inlet provided with a valve seat, a casing supported in the housing and in axial alignment with the valve seat, a valve member received in the casing and bearing on the valve seat, the casing and valve member having clearance space for admission of part of the fluid passing through the valve, means for directing said part of the fluid into said clearance space, the casing having an opening to said chamber from the space above the valve, and a venturi eductor member within the casing in position to cause reduction in the pressure of said admitted fluid within the casing, said reduced pressure tending to withdraw the fluid above the valve through said opening.

7. A relief valve having, in combination, a housing defining a chamber and having an outlet and an inlet provided with a valve seat, a casing supported in the housing in axial alignment with the valve seat and having an open end adjacent thereto, a valve member received in the casing and bearing on the valve seat, a spring urging the valve closed, the casing and valve member having clearance space for admission of part of the fluid passing through the valve, means for directing said part of the fluid into said clearance space, the casing having an opening to said chamber from the space above the valve, and a venturi eductor member within the casing in position to cause reduction in the pressure of said admitted fluid within the casing, said reduced pressure tending to withdraw the fluid above the valve through said opening.

8. A relief valve having, in combination, a housing defining a chamber and having an outlet and an inlet provided with a valve seat, a casing supported in the housing in axial alignment with the valve seat and having an open end adjacent thereto, a valve member received in the casing and bearing on the valve seat, a spring urging the valve closed, the casing and valve member having a clearance space for admission of part of the fluid passing through the valve, a deflector member adjustably mounted on the casing in position to control the quantity of admitted fluid, the casing having an opening to said chamber from the space above the valve, and a venturi eductor member within the casing in position to cause reduction in the pressure of said admitted fluid within the casing, said reduced pressure tending to withdraw the fluid above the valve through said opening.

9. A relief valve having, in combination, a housing defining a chamber and having an outlet and an inlet provided with a valve seat, a casing supported in the housing in axial alignment with the valve seat, a valve member received in the casing and bearing on the valve seat, a bellows received within the casing and having a fixed end and an end secured to the valve member, the casing and valve member having clearance space for admission of part of the fluid passing through the valve, means for directing said part of the fluid into said clearance space, the casing having an opening to said chamber, and a venturi eductor member within the casing in position to cause reduction in the pressure of said admitted fluid within the casing, said reduced pressure tending to withdraw the fluid above the valve through said opening.

10. A relief valve having, in combination, a housing defining a chamber and having an outlet and an inlet provided with a valve seat, a casing supported in the housing in axial alignment with the valve seat, a valve member received in the casing and bearing on the valve seat, a bellows received within the casing, having an effective area substantially equal to that of the valve seat and having a fixed end and an end secured to the valve member, the casing and valve member having clearance space for admission of part of the fluid passing through the valve, means for directing said part of the fluid into said clearance space, the casing having an opening to said chamber, and a venturi eductor member within the casing in position to cause reduction in the pressure of said admitted fluid within the casing, said reduced pressure tending to withdraw the fluid above the valve through said opening.

References Cited in the file of this patent

UNITED STATES PATENTS

| | | |
|---|---|---|
| 1,685,866 | Raymond | Oct. 2, 1928 |
| 2,227,578 | Fraser | Jan. 7, 1941 |